US012707257B2

(12) United States Patent
Kapale et al.

(10) Patent No.: US 12,707,257 B2
(45) Date of Patent: Aug. 11, 2026

(54) METHOD AND DEVICE FOR MANAGING SECURITY DOMAIN ACCESS INFORMATION OF MIGRATED USERS

(71) Applicant: Samsung Electronics Co., Ltd., Gyeonggi-do (KR)

(72) Inventors: Kiran Gurudev Kapale, Bangalore (IN); Arunprasath Ramamoorthy, Bangalore (IN); Hongjin Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 158 days.

(21) Appl. No.: 18/501,215

(22) Filed: Nov. 3, 2023

(65) Prior Publication Data

US 2024/0155337 A1 May 9, 2024

(30) Foreign Application Priority Data

Nov. 4, 2022 (IN) ............................ 202241063079
Nov. 10, 2022 (IN) ............................ 202241064332
Oct. 20, 2023 (IN) ............................ 202241063079

(51) Int. Cl.
*H04W 12/04* (2021.01)
*H04L 9/40* (2022.01)
(Continued)

(52) U.S. Cl.
CPC ............. *H04W 12/04* (2013.01); *H04L 63/20* (2013.01); *H04W 12/08* (2013.01); *H04W 12/086* (2021.01); *H04W 8/12* (2013.01)

(58) Field of Classification Search
CPC ... H04W 12/04; H04W 12/08; H04W 12/086; H04W 8/12; H04L 63/20
See application file for complete search history.

(56) References Cited

U.S. PATENT DOCUMENTS 9,276,737 B2 * 3/2016 Peirce .................. H04L 9/0822
2007/0293216 A1 * 12/2007 Jiang .................. H04W 12/062
455/433

(Continued)

FOREIGN PATENT DOCUMENTS

CN 113225440 8/2021

OTHER PUBLICATIONS

Ericsson, "Private Call Towards a Migrated MC User", S6-222948, 3GPP TSG-SA WG6 Meeting #51-e, e-meeting, Oct. 10-19, 2022, 5 pages.

(Continued)

*Primary Examiner* — Cheng-Feng Huang
(74) *Attorney, Agent, or Firm* — The Farrell Law Firm, P.C.

(57) ABSTRACT

The disclosure relates to a 5G or 6G communication system for supporting a higher data transmission rate. A method and a first mission critical (MC) server are provided for managing security domain access information of migrated users in a private communication in MC services. A first MC server receives a private call request from an MC service user of a first UE for establishing the private communication with an MC service user of a second UE. It is determined whether the MC service user of the second UE is migrated from the first MC server to at least one secondary MC server. A private call redirection message is generated, and the private call redirection message is transmitted to the MC service user of the first UE to establish the private communication with the MC service user of the second UE based on the private call redirection message.

12 Claims, 12 Drawing Sheets

(51) Int. Cl.

| | |
|---|---|
| ***H04W 12/08*** | (2021.01) |
| ***H04W 12/086*** | (2021.01) |
| *H04W 8/12* | (2009.01) |

(56) References Cited

U.S. PATENT DOCUMENTS

| | | | | |
|---|---|---|---|---|
| 2013/0305333 | A1 * | 11/2013 | Katzer | H04W 12/08 726/3 |
| 2014/0137184 | A1 * | 5/2014 | Russello | H04L 63/20 726/1 |
| 2015/0040224 | A1 * | 2/2015 | Litva | H04L 63/1441 726/23 |
| 2015/0056954 | A1 * | 2/2015 | Quiriconi | H04L 67/54 455/411 |
| 2019/0228406 | A1 * | 7/2019 | Patel | G06F 21/45 |
| 2023/0096899 | A1 * | 3/2023 | Smith-Rose | H04L 63/1416 726/4 |

OTHER PUBLICATIONS

3GPP TS 33.180 V17.7.0, 3GPP, 3rd Generation Partnership Project; Technical Specification Group Services and System Aspects; Security of the Mission Critical (MC) Service; (Release 17), Sep. 2022, 205 pages.

Ericsson, "Private Call Towards a Migrated MC User", S6-222718, 3GPP TSG-SA WG6 Meeting #51-e, e-meeting, Oct. 10-19, 2022, 5 pages.

Motorola Solutions, "Migration User Authentication and Authorization", S3-181176, 3GPP TSG-SA WG3 Meeting #91, Apr. 16-20, 2018, 6 pages.

International Search Report dated Feb. 16, 2024 issued in counterpart application No. PCT/KR2023/017542, 9 pages.

* cited by examiner

METHOD AND DEVICE FOR MANAGING SECURITY DOMAIN ACCESS INFORMATION OF MIGRATED USERS

CROSS REFERENCE TO RELATED APPLICATION(S)

The present application is based on and claims priority from two Indian Provisional Application Nos. 202241063079 filed on Nov. 4, 2022, and 202241064332 filed on Nov. 10, 2022, and Indian Complete Application No. 202241063079 filed on Oct. 20, 2023, the entire disclosure of each which is incorporated herein by reference.

BACKGROUND

1. Field

The present disclosure relates to electronic devices, and more particularly, to a method and mission critical (MC) servers for managing security domain access information of migrated users in a private communication in MC services.

2. Description of the Related Art 5G mobile communication technologies define broad frequency bands such that high transmission rates and new services are possible, and can be implemented not only in "Sub 6 GHz" bands such as 3.5 GHz, but also in "above 6 GHz" bands referred to as mmWave including 28 GHz and 39 GHz. In addition, it has been considered to implement 6G mobile communication technologies (referred to as beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-in multiple-out (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Generally, mission critical (MC) services provides continuous and uninterrupted communication during the event of a disaster or emergency. Mission critical services are attractive targets for unauthorized access because they are essential to the operation of organizations and systems. If the MC service is hacked, that produces a serious impact on the organization or the system's ability to function, and can lead to financial losses, reputational damage, and even loss of life. Thus, security function is an important function in the MC services to provide end-to-end security for a communication between MC service users. The end-to-end security provides assurance to MC service users that no unauthorized access to the communications is taking place between the MC service users within a MC service network.

However, when a user migrated from a primary system to a partner system, the conventional methods and system fail to provide assurance of end-to-end security in the communication between the MC service users in a primary system and a migrated user in a partner system.

Thus, it is desired to provide a mechanism for providing end-to-end security in the communication between the MC service users in the primary system and the migrated user in the partner system.

SUMMARY

Aspects of the disclosure are to address at least the above-mentioned problems and/or disadvantages and to provide at least the advantages described below. Accordingly, an aspect of the disclosure is to provide a device and method performed by a in a wireless communication system.

A principal aspect of the embodiments herein is to provide a method and a first MC server for managing security domain access information of migrated users in a private communication in MC services. The method includes generating, by the first MC server, a private call redirection message when an MC service user of at least one second UE is migrated from the first MC server to at least one secondary MC server. The method further includes transmitting, by the first MC server, the private call redirection message to the MC service user of first UE to further establish the private communication with the MC service user of the at least one second UE based on the private call redirection message.

Another aspect of the embodiments herein is to verify whether the migration of the MC service user of the at least one second UE is permitted to the at least one secondary MC server (or system) based on a migration service authorization request or a configuration document.

Another aspect of the embodiments herein is to establish communication using the security domain access information, wherein the security domain access information is a key management server (KMS) uniform resource identifier (URI) associated with an MC service ID of the at least one MC service user of the at least one second UE.

Additional aspects will be set forth in part in the description which follows and, in part, will be apparent from the description, or may be learned by practice of the presented embodiments.

Accordingly, embodiments herein disclose a method for managing security domain access information of migrated users in a private communication in MC services. The method includes receiving, by a first MC server, a private call request from a MC service user of first UE for establishing the private communication with MC service user of at least one second UE. Further, the method includes determining, by the first MC server, whether the MC service user of the at least one second UE is migrated from the first MC server to at least one secondary MC server. Further, the method includes generating, by the first MC server, a private call redirection message when the MC service user of the at least one second UE is migrated from the first MC server to at least one secondary MC server, wherein the private call redirection message comprises the security domain access information of the at least one secondary MC server, an information that the MC service user of the at least one second UE is migrated to the at least one secondary MC server, and a MC service identifier (ID) of the MC service user of the at least one second UE. Further, the method includes transmitting, by the first MC server, the private call redirection message to the MC service user of first UE to further establish the private communication with the MC service user of the at least one second UE based on the private call redirection message.

In an embodiment, the method includes retrieving configuration document of the MC service user of the at least one second UE from a storage, wherein the configuration document comprises user profile of the MC service user of the at least one second UE and the security domain information of the at least one secondary MC system.

In an embodiment, the method includes receiving the migration service authorization request from the one of second MC server or the MC service user of the at least one second UE, wherein the migration service authorization request comprises at least one of the information that the MC service user of second UE is migrated to the at least one secondary MC server, a MC service ID of the MC service user of the at least one second UE and security domain access information of the at least one secondary MC server.

In an embodiment, the method includes verifying, by the first MC server, whether the migration of the MC service user of the at least one second UE is permitted to the at least one secondary MC system based on the migration service authorization request or the configuration document. Further, the method includes storing, by the first MC server, the security domain information of the at least one secondary MC system when the migration of the MC service user of the at least one second UE is permitted to the at least one secondary MC system based on the migration service authorization request or the configuration document. Further, the method includes generating, by the first MC server, the private call redirection message comprises the security domain access information of the at least one secondary MC server, the information that the MC service user of the at least one second UE is migrated to the at least one secondary MC server, and the MC service ID of the MC service user of the at least one second UE.

In an embodiment, the security domain access information is a KMS URI associated with the MC service ID of the at least one MC service user of the at least one second UE, wherein the KMS URI allows the first MC service user of first UE to download required security domain parameters and key materials to establish an end-to-end security connection during private communication.

In an embodiment, the first MC server determines whether the MC service user of the at least one second UE is migrated from the first MC server to the at least on secondary MC server based on a new MC service ID assigned by the at least one secondary MC server.

Accordingly, embodiments herein disclose a method for managing security domain access information of migrated users in the private communication in MC services. The method includes transmitting, by the first UE, the private call request to the first MC server based on the input from MC service user for establishing the private communication with the MC service user of the at least one second UE. Further, the method includes receiving, by the first UE, the private call redirection message from the first MC server comprises at least one of: the information that the second UE is migrated to at least one secondary MC server, MC service ID of the MC service user of the at least one second UE and security domain access information of the at least one secondary MC server; wherein the first MC server determines that the MC service user of the at least one second UE is migrated from the first MC server to the at least one secondary MC server. Further, the method includes establishing, by the first UE, the private communication of MC service user of the first UE with the MC service user of the at least one second UE based on the private call redirection message.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF FIGURES

The above and other aspects, features, and advantages of certain embodiments of the disclosure will be more apparent from the following description taken in conjunction with the accompanying drawings, in which.

DETAILED DESCRIPTION

Figure 1:
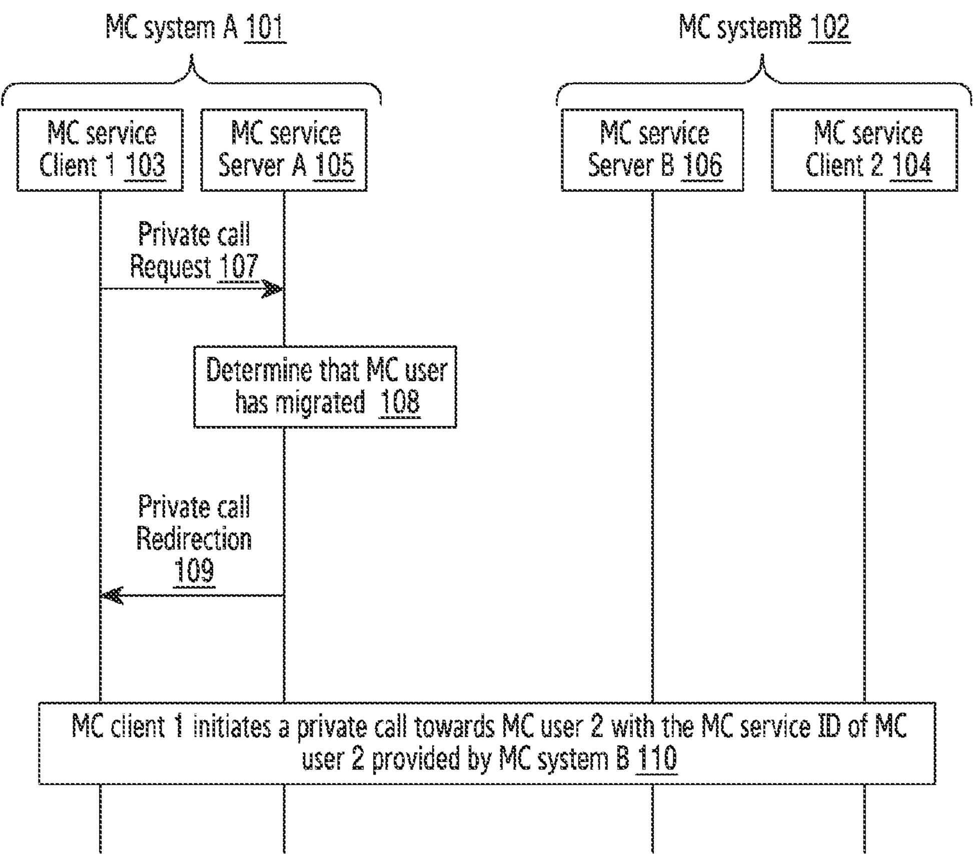
FIG. 1 is a flow chart illustrating establishment of an MC private connection towards a migrated MC service user.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as various embodiments can be combined with one or more other embodiments to form new embodiments. The term “or” as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like. may be used herein to describe various elements, these elements should not be limited by these terms. These terms are generally only used to distinguish one element from another.

Accordingly, embodiments herein disclose a method for managing security domain access information of migrated users in a private communication in MC services. The method includes receiving, by a first MC server, a private call request from a MC service user of first UE for establishing the private communication with MC service user of at least one second UE. Further, the method includes determining, by the first MC server, whether the MC service user of the at least one second UE is migrated from the first MC server to at least one secondary MC server. Further, the method includes generating, by the first MC server, a private call redirection message when the MC service user of the at least one second UE is migrated from the first MC server to at least one secondary MC server, wherein the private call redirection message comprises the security domain access information of the at least one secondary MC server, an information that the MC service user of the at least one second UE is migrated to the at least one secondary MC server, and a MC service identifier (ID) of the MC service user of the at least one second UE. Further, the method includes transmitting, by the first MC server, the private call redirection message to the MC service user of first UE to further establish the private communication with the MC service user of the at least one second UE based on the private call redirection message.

Accordingly, embodiments herein disclose a method for managing security domain access information of migrated users in the private communication in MC services. The method includes transmitting, by the first UE, the private call request to the first MC server based on the input from MC service user for establishing the private communication with the MC service user of the at least one second UE. Further, the method includes receiving, by the first UE, the private call redirection message from the first MC server comprises at least one of: the information that the second UE is migrated to at least one secondary MC server, MC service ID of the MC service user of the at least one second UE and security domain access information of the at least one secondary MC server; wherein the first MC server determines that the MC service user of the at least one second UE is migrated from the first MC server to the at least one secondary MC server. Further, the method includes establishing, by the first UE, the private communication of MC service user of the first UE with the MC service user of the at least one second UE based on the private call redirection message.

In an embodiment, the primary system is referred as first server and the partner system is referred as second server.

Accordingly, embodiments herein disclose an MC service in the field of mission critical services that are used by public safety communities (such as police, military, fire services, ambulance crews, and many more) in their operations that require high reliability, speed, quick accessibility and low latency operational support. Unlike conventional methods and systems, the disclosed system relates to public safety communities, in which the public safety users are allowed to migrate to partner systems and communicate with primary system users or partner system users.

Unlike conventional methods and systems, the disclosed system provides end-to-end security for the communication, where a calling MC service user is aware of a called migrated MC service user associated with the security domain access information.

FIG. 1 is a flow chart illustrating establishment of MC private connection towards the migrated MC service user.

At operation 107, a MC service client 1 (103) transmits a private call request to an MC service server A (105) to establish a communication with MC service client 2 (104), where the MC service client 1 (103) and the MC service server A (105) are present under an MC system A (101). At operation 108, the MC service server A (105) determines whether the MC service client 2 (104) is migrated to an MC service server B (106), where the MC service client 2 (104) and the MC service server B (106) are present under an MC system B (102). The private call request includes among others the MC service ID of MC service client 2 (104), which is provided by the MC service server A 105.

At operation 109, the MC service server A 105 transmits a private call redirection message to the MC service client 1 (103) when the user is migrated.

At operation 110, the MC service client 1 103 initiates the private connection towards MC service client 2 (104) with the private call redirection message. Where the redirection message comprises an MC service ID of the MC service client 2 (104) that is provided by the MC system B (102).

The conventional method and system does not disclose how and when the access information of security domain of the migrated MC service user's MC service ID of the partner system is made known or available to the initiator of the private call when the target user is migrated to another MC service system. Thus, without the access information of security domain of the initiator of the private call, the conventional method and system cannot determine key material to be used to establish a security context and the call cannot be established with end-to-end security.

The private connection includes, but not limited to, an MCPTT private call, a MCVideo private call, or a corresponding one-to-one MCData communication.

Figure 2:
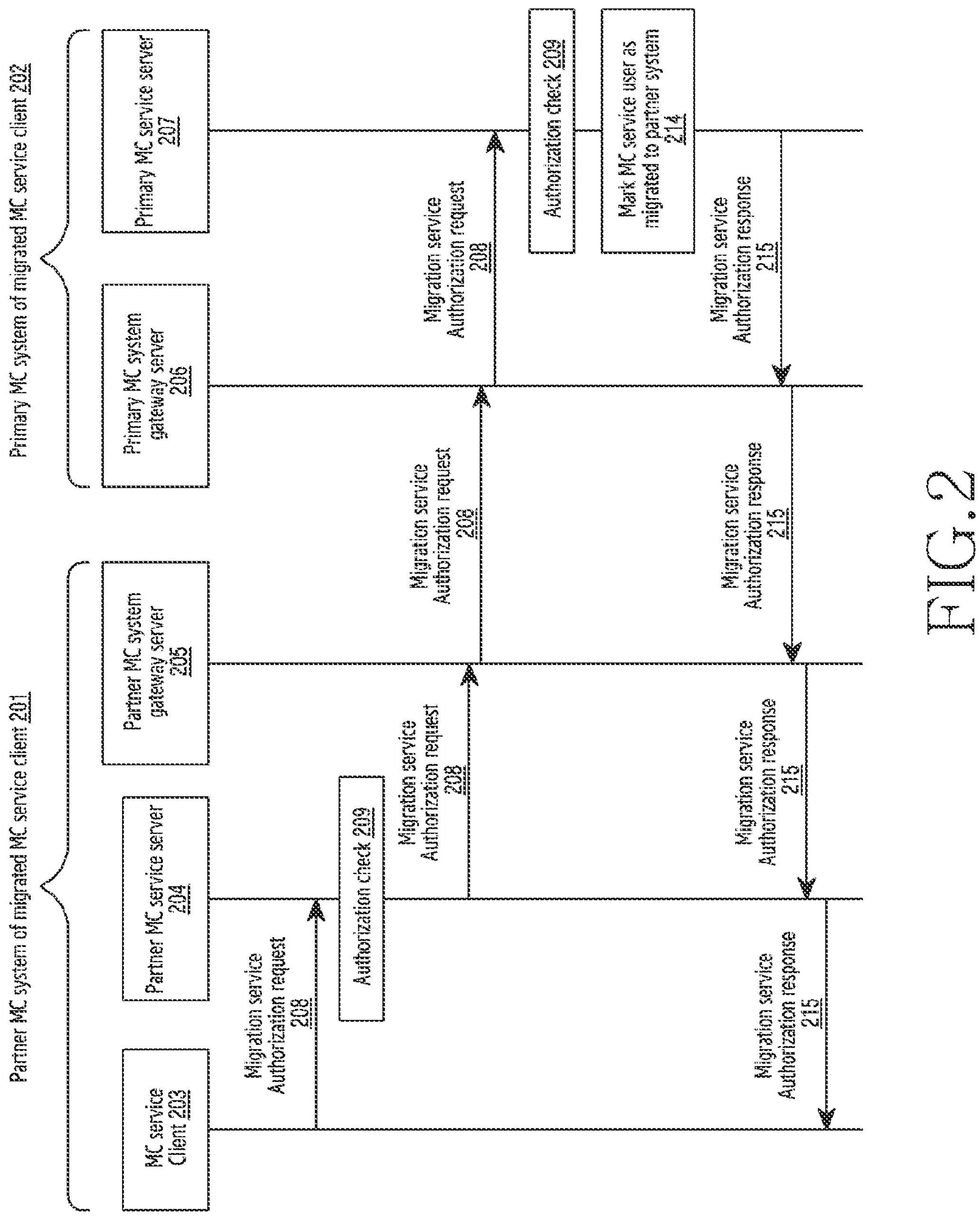
FIG. 2 is a sequence diagram illustrating a procedure for an MC service authorization for migration to a partner MC system.

FIG. 2 is a sequence diagram illustrating a procedure for MC service authorization for migration to the partner MC system.

Preconditions for a migration scenario is as follows:

1. The MC service user wishes to migrate to the partner MC system.
2. The MC service client is configured with an MC service user profile that contains the necessary parameters needed for connectivity with the partner MC system (201).
3. A user authentication process has taken place which has supplied the necessary credentials to the MC service client to permit service authorization to take place in the partner system.

In the migration scenario, a partner MC system (201) of migrated MC service client comprises an MC service Client (203), a Partner MC service server (204), a Partner MC system gateway server (205). Further a primary MC system (202) of migrated MC service client comprises a primary MC system gateway server (206) and a primary MC service server (207).

At operation 208, the MC service Client (203) transmits a migration service authorization request to the primary MC service server (207) through the Partner MC service server (204), the Partner MC system gateway server (205), the primary MC system gateway server (206) and the primary MC service server (207). The primary MC service server (207) and Partner MC service server (204) perform an authorization check (209) on the migration service authorization request (208).

At operation 214, the primary MC service server (207) marks the MC service user as migrated to the partner system.

At operation 215, the primary MC service server (207) transmits a migration service authorization response (215) to the MC service Client (203) through the primary MC service server (207), the primary MC system gateway server (206), and the Partner MC system gateway server (205), the Partner MC service server (204).

The conventional method has defined the generic private call procedure towards the migrated MC service user at a partner system. The migrated MC service user is reachable by his/her MC service ID which is assigned by the primary MC system via redirection done by the primary MC system's MC service server to the migrated MC system's MC service server based on the MC service ID provided by the migrated MC system.

In general, the MC service allows an MC service user to migrate from the primary MC system to the partner MC system, migrate from the partner MC system to another partner MC system and return back to the primary MC system. The MC service users from the partner MC system or another partner MC system or primary MC system can communicate with the migrated MC service user. The migration of the MC service user is authorized by the primary MC system of the migrating MC service user whenever the MC service user is migrated from the primary MC system to the partner MC system to another partner MC system. While the MC service user is in the migrated MC system, the MC service users of the migrated MC system can communicate with the migrated MC service user using the MC service ID of the migrated MC service user which belongs to the migrated MC system and a communication request is routed within the migrated MC system. The communication request should be routed through/or to the primary MC system of the migrated MC service user if the migrated MC service user migrates back to the primary MC system or another partner MC system.

Referring to FIG. 2, the conventional method for service authorization for migration to the partner MC system, the migration of the MC service user is authorized by the primary MC system of the migrating MC service user whenever the MC service user is migrating from the primary MC system to the partner MC system or from the migrated partner MC system to another partner MC system. While the MC service user is in the migrated MC system, the MC service users of the migrated MC system can communicate with the migrated MC service user using the MC service ID of the migrated MC service user which belongs to the migrated MC system and the communication request is routed within the migrated MC system. If the migrated MC service user migrates back to its primary MC system or another partner MC system then the communication request should be routed through/or to the primary MC system of the migrated MC service user.

The conventional method defined the service authorization mechanism for migration to the partner MC system. The service authorization mechanism is used by the MC service user as a part of the migration process. The migrating MC service user's primary MC system authorizes and marks that the MC service user has migrated to the partner MC system.

However, the conventional method does not provide end to end security for security domain of the migrated MC service user's MC service ID of the partner system and the migrated MC service user's MC service ID of the partner system.

Referring now to FIGS. 3 through 8, where similar reference characters denote corresponding features consistently throughout the figures, there are shown several embodiments.

Figure 3:
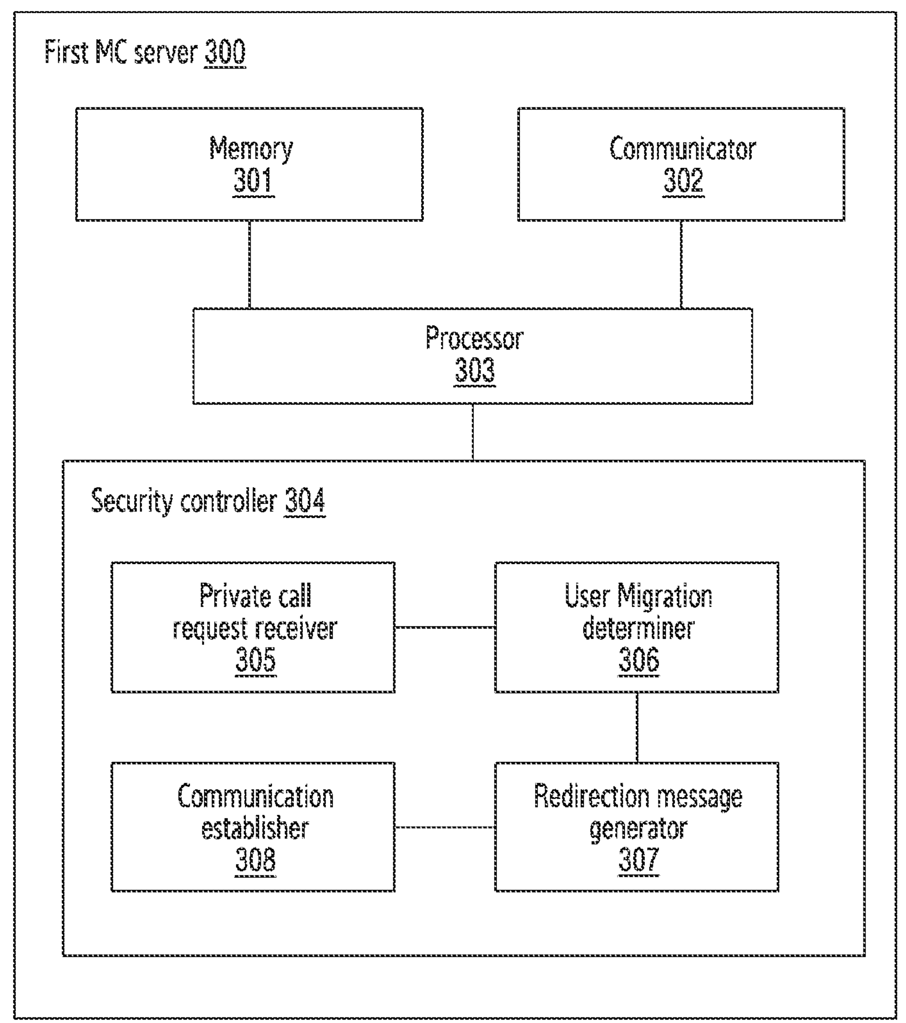
FIG. 3 is a block diagram of a first MC server for managing security domain access information of migrated users in a private communication in MC services, according to an embodiment.

FIG. 3 is a block diagram of a first MC server 300 for managing security domain access information of migrated users in a private communication in MC services, according to an embodiment.

The first MC server includes a memory 301, a processor 303, a communicator 302, and a security controller 304. The security controller 304 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

The memory 301 is configured to store instructions to be executed by the processor 303. The memory 301 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 301 may, in various examples, be considered a non-transitory storage medium. The term "non-transitory" may indicate that the storage medium is not embodied in a carrier wave or a propagated signal. However, the term "non-transitory" should not be interpreted that the memory 301 is non-movable. In various examples, the memory 301 can be configured to store larger amounts of information. In certain examples, a non-transitory storage medium may store data that can, over time, change (e.g., in random access memory (RAM) or cache).

The processor (303) communicates with the memory 301, the communicator 302 and the neuro-symbolic AI security controller 304. The processor 303 is configured to execute instructions stored in the memory 301 and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an AI dedicated processor such as a neural processing unit (NPU).

The communicator 302 includes an electronic circuit specific to a standard that enables wired or wireless communication. The communicator 302 is configured to communicate internally between internal hardware components of the electronic device and with external devices via one or more networks.

In an embodiment, the security controller 304 comprises a private call request receiver 305, a user migration determiner 306, a redirection message generator 307 and a communication establisher 308.

The private call request receiver 305 receives a private call request from an MC service user of a first UE for establishing the private communication with an MC service user of at least one second UE.

The user migration determiner 306 determines whether the MC service user of the at least one second UE is migrated from the first MC server to at least one secondary MC server. The redirection message generator 307 generates a private call redirection message when the MC service user of the at least one second UE is migrated from the first MC server to at least one secondary MC server, wherein the private call redirection message comprises the security domain access information of the at least one secondary MC server, an information that the MC service user of the at least one second UE is migrated to the at least one secondary MC server, and an MC service identifier (ID) of the MC service user of the at least one second UE. The communication establisher 308 transmits the private call redirection message to the MC service user of the first UE to further establish the private communication with the MC service user of the at least one second UE based on the private call redirection message.

The security controller 304 is configured to retrieve a configuration document of the MC service user of the at least one second UE from a storage, wherein the configuration document comprises a user profile of the MC service user of the at least one second UE and the security domain information of the at least one secondary MC system. The security controller 304 is configured to receive the migration service authorization request from one of the second MC server or the MC service user of the at least one second UE, wherein the migration service authorization request comprises at least one of the information that the MC service user of the second UE is migrated to the at least one secondary MC server, an MC service ID of the MC service user of the at least one second UE and security domain access information of the at least one secondary MC server. Further, the security controller 304 is configured to verify whether the migration of the MC service user of the at least one second UE is permitted to the at least one secondary MC server based on the migration service authorization request or the configuration document. Further, the security controller 304 is configured to store the security domain information of the at least one secondary MC server when the migration of the MC service user of the at least one second UE is permitted to the at least one secondary MC server based on the migration service authorization request or the configuration document. Further, the security controller 304 is configured to generate the private call redirection message comprising the security domain access information of the at least one secondary MC server, the information that the MC service user of the at least one second UE is migrated to the at least one secondary MC server, and the MC service ID of the MC service user of the at least one second UE.

In an embodiment, the security domain access information is a KMS URI associated with the MC service ID of the at least one MC service user of the at least one second UE, wherein the KMS URI allows the first MC service user of first UE to download required security domain parameters and key materials to establish an end-to-end security connection during private communication.

In an embodiment, KMS (Key management server) a functional entity that stores and provides security related information (e.g. encryption keys) to the key management client, group management server and MC service server(s) to achieve the security goals of confidentiality and integrity of media and signalling.

The first MC server determines whether the MC service user of the at least one second UE is migrated from the first MC server to the at least one secondary MC server based on a new MC service ID assigned by the at least one secondary MC server.

The first UE manages security domain access information of a migrated user in the private communication in MC services. The first UE comprises a memory, a processor and a security communication controller coupled to the memory and the processor. The security communication controller is configured to transmit the private call request to the first MC server based on the input from the MC service user for establishing the private communication with the MC service user of the at least one second UE. Further, the security communication controller is configured to receive the private call redirection message from the first MC server comprising at least one of: the information that the second UE is migrated to at least one secondary MC server, MC service ID of the MC service user of the at least one second UE and security domain access information of the at least one secondary MC server; wherein the first MC server determines that the MC service user of the at least one second UE is migrated from the first MC server to the at least one secondary MC server. Further, the security communication controller is configured to establish the private communication of MC service user of the first UE with the MC service user of the at least one second UE based on the private call redirection message.

Figure 4:
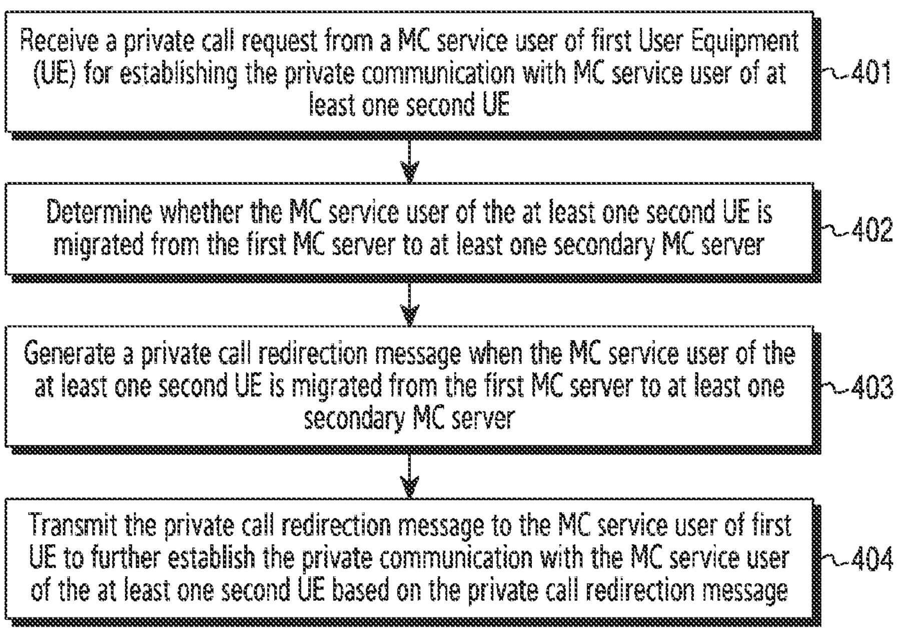
FIG. 4 is a flow chart illustrating a method for managing the security domain access information of the migrated users in the private communication in the MC services, according to an embodiment.

FIG. 4 is a flow chart illustrating a method for managing security domain access information of migrated users in the private communication in the MC services, according to an embodiment.

At step 401, the first MC server receives the private call request from the MC service user of first UE for establishing the private communication with an MC service user of at least one second UE.

At step 402, the first MC server determines whether the MC service user of the at least one second UE is migrated from the first MC server to at least one secondary MC server.

At step 403, the first MC server generates the private call redirection message when the MC service user of the at least one second UE is migrated from the first MC server to at least one secondary MC server.

At step 404, the first MC server transmits the private call redirection message to the MC service user of the first UE to further establish the private communication with the MC service user of the at least one second UE based on the private call redirection message.

The various actions, acts, blocks, steps, operations, or the like in the flow chart of FIG. 4 may be performed in the order presented, in a different order or simultaneously. Further, in various embodiments, some of the actions, acts, blocks, steps, operations, or the like may be omitted, added, modified, skipped, or the like without departing from the scope of the invention.

In an embodiment, the primary system is referred as one of a first MC server, MC service server A and primary MC service server.

In an embodiment, the partner system is referred as one of a second MC server, MC service server B, partner MC service server and a migration server.

Figure 5:
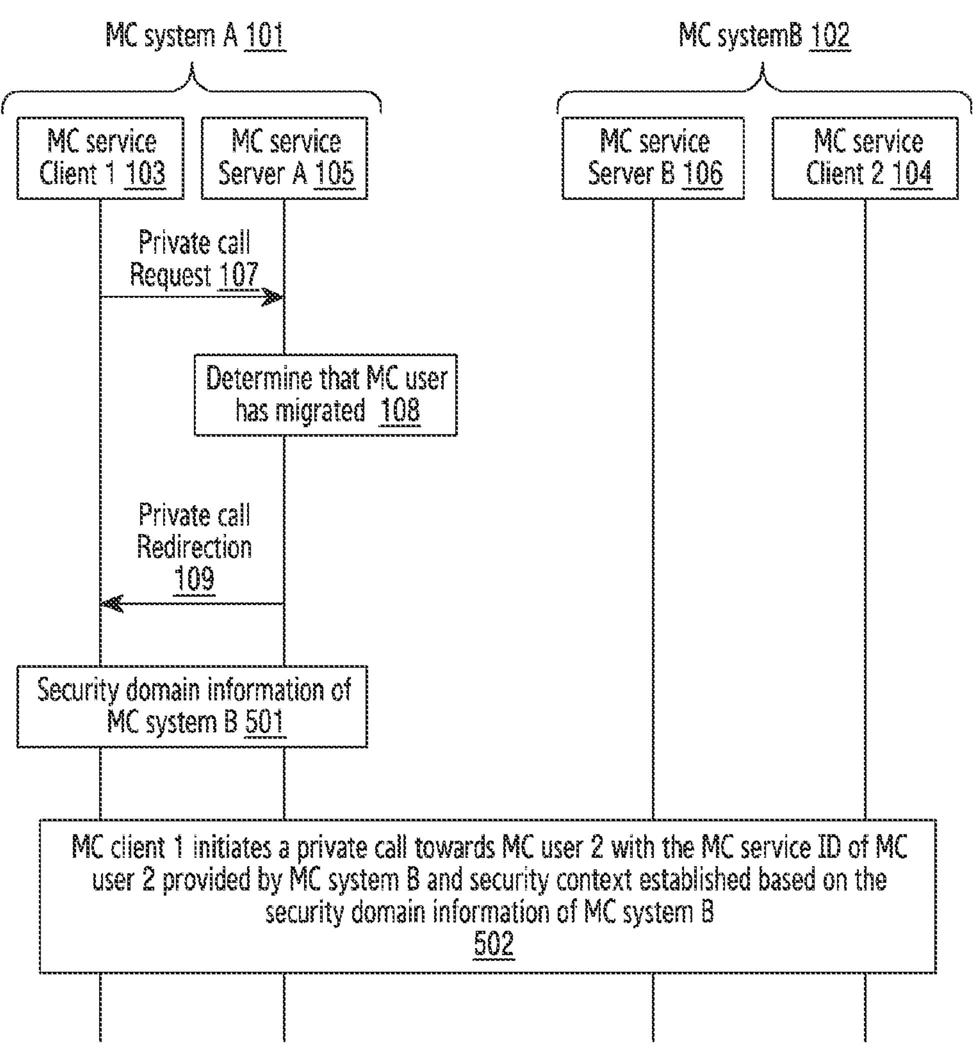
FIG. 5 is a sequence diagram illustrating a method for managing the security domain access information of the migrated users in the private communication, according to an embodiment.

FIG. 5 is a sequence diagram illustrating a method for managing the security domain access information of the migrated users in the private communication, according to an embodiment.

At operation 107, a MC service client 1 (103) transmits a private call request to an MC service server A (105) to establish a communication with MC service client 2 (104), where the MC service client 1 (103) and the MC service server A (105) are present under MC system A (101). The MC service server A (105) determines at operation 108 whether the MC service client 2 (104) is migrated to MC service server B (106), where the MC service client 2 (104) and the MC service server B (106) are present under MC system B (102).

At operation 109, the MC service server A (105) transmits the private call redirection message to the MC service client 1 (103) when the user is migrated. The private call redirection message comprises the security domain access information of the MC system B (501), an information that the MC service user of the migrated user and an MC service identifier (ID) of the MC service user of the MC service client 2 (104).

At 502, the MC client 1 initiates the private call towards MC user 2 with the MC service ID of MC user 2 provided by MC system B and security context established based on the security domain information of MC system B.

In an embodiment, the method provides a way for the access information of the security domain of the migrated MC service user's MC service ID of the partner system is made available to the originator of a private call towards the migrated MC service user so that the communication can be established with end-to-end security.

The disclosed method is applicable for other services such as MCVideo and MCData.

The method is performed in two parts. In Part A the MC service server is returning the security domain access information associated with the migrated MC service user when the MC private call towards the migrated MC service user is originated, and in Part B, describes how the MC service server determines the security domain access information associated with the migrated MC service user when a MC private call towards a migrated MC service user is originated.

In an embodiment, the determination of the security domain access information is accomplished by plurality of ways: the migrated MC service user's MC service server of the primary system determining (security domain associated with migrated MC service user's MC service ID of the partner system) by dipping into the migrated MC service user's selected user profile of the primary system.

The migrated MC service user's MC service server of the primary system using the stored information (security domain associated with the migrated MC service user's MC service ID of the partner system) which is shared by the migrated MC service user's MC service client or the MC service server of the partner system to which the user has migrated. During the migration authorization procedure, along with the partner system assigned MC service ID, the associated security domain access information is also shared with the migrated MC service user's MC service server of the primary system.

The method to share the access information of the security domain associated with the migrated MC service user while initiating private communication by the MC service user from the primary system of the migrated MC service user with end-to-end security context. A new information element is defined to carry the security domain access information associated with the migrated MC service user from the MC service server of the calling MC service user belonging to the primary system of the migrated MC service user while initiating private communication with end-to-end security context. A new information element is defined to carry the security domain access information associated with the migrating user from the MC service server of the migrating system to the primary system of migrating user while performing the migration service authorization from the MC service client of the migrating MC service user to the partner MC service server, and from the partner MC service server to the primary MC service server of the migrating MC service user.

The disclosed method helps in providing the access information of security domain associated with the migrated MC service user's MC service ID of the partner system. Using the access information of security domain, the MC service user can download the required security domain parameters and key materials to establish end-to-end security context during private communication.

Referring back to FIG. 5, the MC service server returning security domain access information associated with the migrated MC service user when an MC private call towards a migrated MC service user is originated. In this method, existing information flows defined in the conventional method are enhanced to include the new information element "Security domain access information" to carry the security domain access information associated with the MC service ID of the migrated MC service user, which the migrated MC service user has obtained from its migrated MC system after migration, when an MC private call towards a migrated MC service user is initiated.

The migrated MC service user's MC service server of the primary system dips into the migrated MC service user's selected user profile of the primary system on receiving of the private call request or based on the mapping information stored while authorizing the migration of the MC service user. Once the security domain access information associated with the migrated MC service user's MC service ID of the partner system is determined, the information is made available to the originator of the private call using private call redirection response.

The originator of the private call uses the newly received MC service ID and security domain access information associated with the migrated MC service user's MC service ID of the partner system to prepare security context and re-establish a call. The disclosed method illustrates the high-level procedure for sharing the security domain access information of the migrated MC service user and the detailed operations are as below:

Information flows for generic private call procedure towards a migrated MC service user. Table 1 describes the information flow of the private call redirection, which is sent from the MC service server to an MC service client initiating the private call towards the migrated MC service user.

TABLE 1

| Information element | Status | Description |
|---|---|---|
| MC service ID | M | The MC service ID of the MC service user initiating a private call, i.e., calling party. The MC service ID can either be MCPTT ID, MCVideo ID, or MCData ID. |
| MC service ID | M | The MC service ID of the target MC service user (i.e., called party), which the user has obtained from its primary MC system before migration. The MC service ID can either be MCPTT ID, MCVideo ID, or MCData ID. |
| MC service ID | M | The MC service ID of the target MC service user, which the user has obtained from its migrated MC system after Migration. The MC service ID can either be MCPTT ID, MCVideo ID, or MCData ID. |
| Security domain access information | M | The security domain access information associated with the MC service ID of the target MC service user, which the user has obtained from its migrated MC system after migration (e.g., KMS URI). |
| Redirection reason | O | The MC service server informs the calling party that the target user has migrated. |

Figure 6:
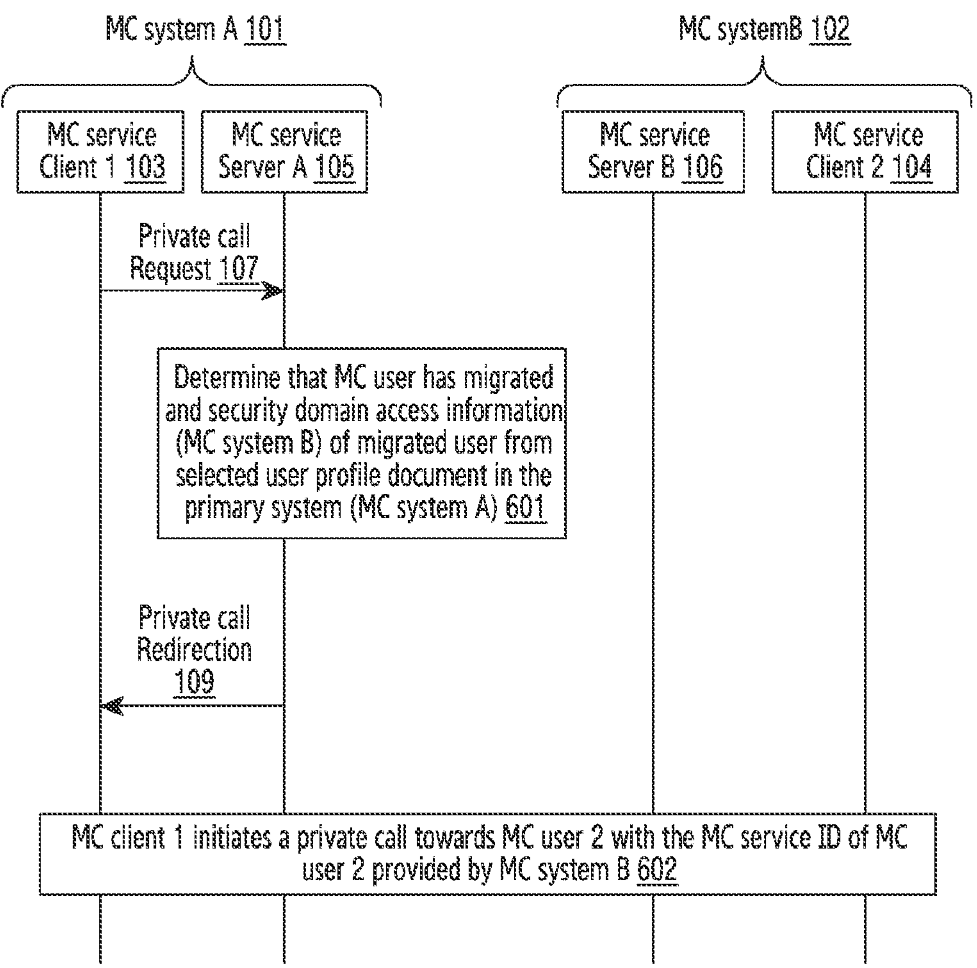
FIG. 6 is a sequence diagram illustrating a method of managing private communication using a primary system user profile, according to an embodiment.

FIG. 6 is a sequence diagram illustrating a method of managing the private communication using a primary system user profile, according to an embodiment.

Referring to FIG. 6, the security domain access information associated with the migrated MC service user is made available at the primary system's MC service server of the migrated MC service user by dipping into the migrated MC service user's selected primary system user profile. In this method, existing information flows defined in the conventional method "MC Private call towards a migrated MC service user" is enhanced to include the security domain access information associated with the migrated MC service user and made available at the primary system's MC service server of the migrated MC service user. The migrated MC service user's MC service server of the primary system is dipped into the migrated MC service user's selected user profile of the primary system upon receiving the MC private call towards a migrated MC service user.

In an embodiment, when the security domain access information associated with the migrated MC service user's MC service ID of the partner system is determined, the information is made available to the originator of the private call using a private call redirection response. FIG. 6 illustrates the high level procedure on how to determine the security domain access information associated with the migrated MC service user's MC service ID of the partner system and the detailed sequence as below:

At operation 107, the MC service client 1 (103) initiates the private call request at operation 107 towards MC service client 2 (104) who has migrated to MC system B (102). The private call request includes among others the MC service ID of MC service client 2 (104), which is provided by the primary MC system.

At operation 601, the MC service server A (105) checks that MC service client 2 (104) has migrated to MC system B (102) with a new MC service ID assigned by MC system B (102) and determines the security domain access information from the selected user profile document in the primary system (i.e., MC system A (101)) of the migrated MC service user.

At operation 109, the MC service server A (105) transmits the private call redirection towards the MC service client 1 (103), to inform MC service client 1 (103) that MC service client 2 (104) has migrated and its new MC service ID of MC service client 2 (104) assigned by the migrated MC system and its associated security domain access information. The MC service client 1 (103) releases the private call request initiated at operation 107.

At 602, the MC service client 1 (103) initiates the private call towards MC service client 2 (104), including the MC service ID of MC service client 2 (104) obtained from MC system B (102) and security domain access information associated with the migrated MC service user's MC service ID of the partner system to establish security context for the communication. The initiated private call is at least one of the MCPTT private call, the MCVideo private call, or the corresponding one-to-one MCData communication.

Figure 7:
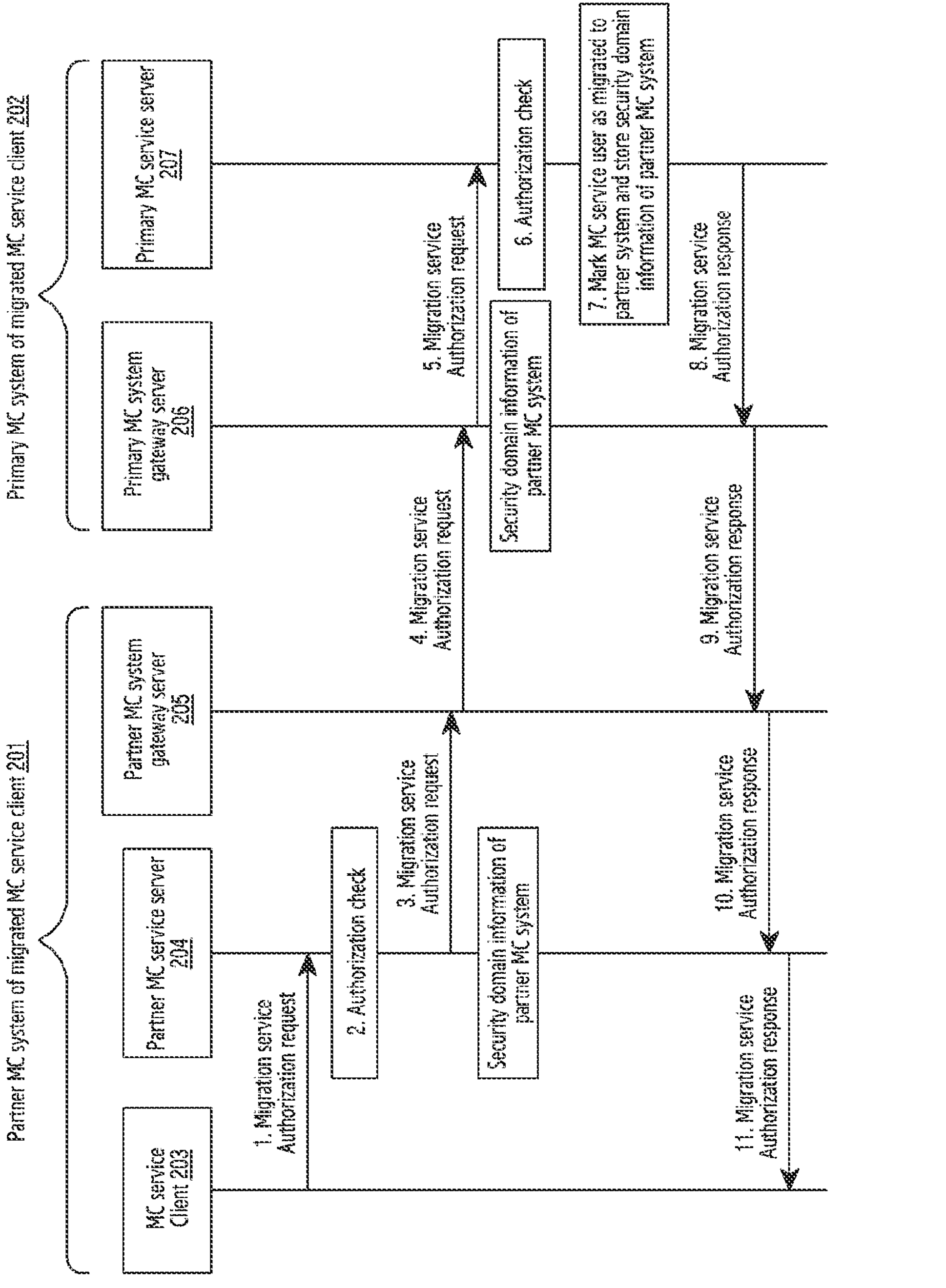
FIG. 7 is a sequence diagram illustrating a method of managing private communication by storing the security domain access information shared from the partner system, according to an embodiment.

FIG. 7 is a sequence diagram illustrating a method of managing the private communication by storing the security domain access information shared from the migrated system, according to an embodiment Referring to FIG. 7, the security domain access information associated with the migrated MC service user is made available at the primary system's MC service server (207) of the migrated MC service user by storing the security domain access information shared from the migrated system. In this method, existing information flows defined in the conventional method "Migration service authorization" is enhanced to include the security domain access information associated with the migrated MC service user and made available at the primary system's MC service server of the migrated MC service user. The MC service client (203) requests migration service authorization with the partner MC service server (204) indicating that the selected MC service user profile to be used during migrated MC service. The MC service client (203) provides both the MC service ID provided during user authentication in the partner MC system, and the MC service ID of the MC service user in the primary MC system of the MC service user. The MC service server includes the security domain access information of the partner system in the migration service authorization request.

In an embodiment, when the security domain access information associated with the migrated MC service user's MC service ID of the partner system is received at the primary system, the information is stored in the MC service server of the primary system in association with the MC service IDs of the migrated MC service user and made available to the originator at the time of the private call towards the migrated MC service user using the private call redirection response. FIG. 7 illustrates the high level procedure on how to determine the security domain access information associated with the migrated MC service user's MC service ID of the partner system and the detailed sequence as below.

At operation 1, the MC service client (203) requests migration service authorization (208 in FIG. 2) with the partner MC service server (204) indicating the selected MC service user profile to be used during migrated MC service. The MC service client (203) provides both the MC service ID provided during user authentication in the partner MC system, and the MC service ID of the MC service user in the primary MC system of the MC service user. In an embodiment, the migrating MC service client (203) also provides authentication credentials which are specified in the conventional methods.

At operation 2, the partner MC service server (204) performs an initial authorization check (209 in FIG. 2) to verify that the MC service user is permitted to migrate to the partner MC system from the primary MC system of the MC service user. In an embodiment, the criteria for the initial authorization check is outside the scope of the present document, but for example could be based on a pre-configured list of users who are expected to request migrated service authorization.

At operation 3, the partner MC service server (204) identifies the primary MC system of the MC service user of the MC service client (203) by use of the MC service ID of the MC service user in the primary MC system of the MC service user, which was presented by the MC service client (203) in operation 1, and sends a migration service authorization request to the gateway server in the partner MC system. The partner MC service server (204) inserts the security domain access information associated with the migrated MC service users MC service ID while sending a migration service authorization request.

At operation 4, the partner MC system gateway server (205) identifies the primary MC system of the MC service user from the MC service ID presented in operation 3, and forwards the migration service authorization request to the gateway server of the primary MC system.

At operation 5, the gateway server in the primary MC system of the MC service user identifies the primary MC service server (207) of the MC service user from the MC service ID presented in operation 3, and forwards the migration service authorization request to that MC service server.

At operation 6, the primary MC service server (207) of the MC service user performs an authorization check, to verify that migration is permitted to that partner MC system by this MC service user using the indicated MC service user profile.

At operation 7, the primary MC service server (207) marks the MC service user as having migrated, and records the partner MC system as the migrated MC system along with the security domain access information associated with the migrated MC service user's MC service ID.

At operation 8, the primary MC service server (207) sends a migration service authorization response to the gateway server in the primary MC system.

At operation 9, the gateway server in the primary MC system sends the migration service authorization response to the gateway server in the partner MC system.

At operation 10, the gateway server in the partner MC system sends the migration service authorization response to the partner MC service server (204).

At operation 11, the partner MC service server (204) sends the migration service authorization response to the MC service client (203), confirming that successful migration and service authorization has taken place. In an embodiment, when topology hiding is not used, the migration service authorization request and migration service authorization response messages are sent between the MC service servers in the primary and partner MC system without the need to be sent via an MC gateway server.

Information flows for migrated service authorization: Table 2 describes the information flow migration service authorization request sent from the MC service client (203) of the migrating MC service user to the partner MC service server (204), and from the partner MC service server (204) to the primary MC service server (207) of the migrating MC service user.

TABLE 2

| Information element | Status | Description |
|---|---|---|
| MC service ID (see NOTE 1) | M | The MC service ID of the migrating MC service user provided by the partner MC system. |
| MC service ID | M | The MC service ID of the migrating MC service user in the primary MC system of the MC service user. |
| MC service user profile index (see NOTE 2) | M | The MC service user profile index of the selected MC service user profile. |
| Security domain access information | M | The security domain access information associated with the MC service ID of the migrating MC service user provided by the partner MC system (e.g., KMS URI). |

NOTE 1:
The MC service ID is provided by the identity management server in the partner MC system during authentication of the migrating MC service user.
NOTE 2:
The MC service user profile index refers to the MC service user profile provided by the primary MC system of the MC service user that has been selected by the MC service user in order to request migrated MC service on the partner MC system.

Figure 8:
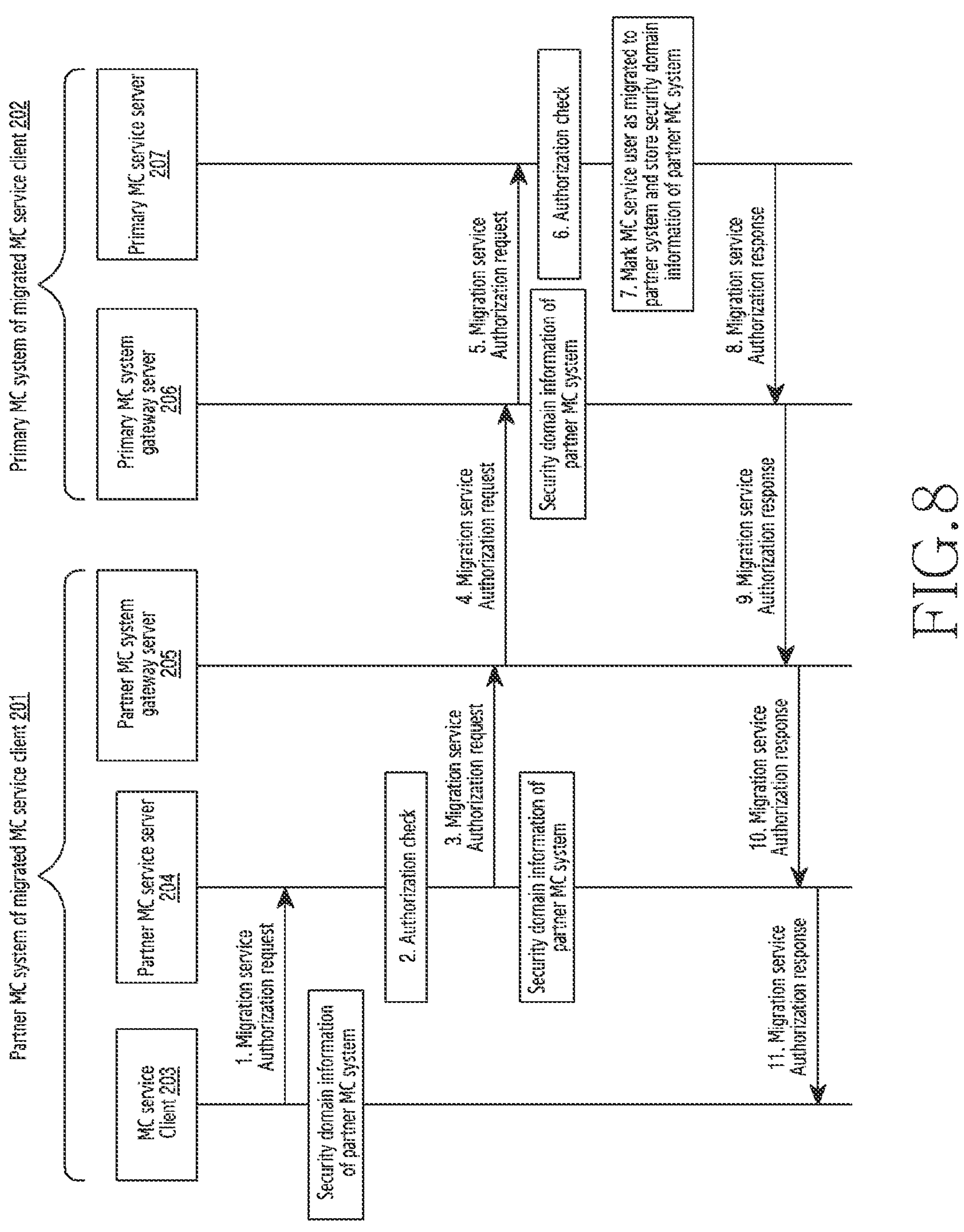
FIG. 8 is a sequence diagram illustrating a method of managing private communication by storing the security domain access information shared from the migrated MC service user, according to an embodiment.

FIG. 8 is a sequence diagram illustrating a method of managing private communication by storing the security domain access information shared from the migrated MC service user, according to an embodiment as disclosed herein.

Referring to FIG. 8, the security domain access information associated with the migrated MC service user is made available at the primary system's MC service server of the migrated MC service user by storing the security domain access information shared from the migrated MC service user. In this method, existing information flows defined in the specification 3GPP TS 23.280 "Migration service authorization" is enhanced to include the security domain access information associated with the migrated MC service user and made available at the primary system's MC service server of the migrated MC service user. The MC service client requests migration service authorization with the partner MC service server indicating that the selected MC service user profile to be used during migrated MC service. The MC service client provides both the MC service ID provided during user authentication in the partner MC system, and the MC service ID of the MC service user in the primary MC system of the MC service user. In addition, the MC service client provide the security domain access information of the partner system.

Once the security domain access information associated with the migrated MC service user's MC service ID of the partner system is received at the primary system, the information is stored in the MC service server of the primary system in association with the MC service IDs of the migrated MC service user and made available to the originator at the time of the private call towards the migrated MC service user using private call redirection response as proposed in the "Proposed Solution Part A" above. Proposed Solution Part B—Option 3 illustrates the high level procedure on how to determine the security domain access information associated with the migrated MC service user's MC service ID of the partner system and the detailed operations as below.

At operation 1, the MC service client requests migration service authorization with the partner MC service server indicating the selected MC service user profile to be used during migrated MC service. The MC service client provides both the MC service ID provided during user authentication in the partner MC system, and the MC service ID of the MC service user in the primary MC system of the MC service user. In addition, the MC service client provides the security domain access information of the partner system. In an embodiment, the migrating MC service client also provides authentication credentials which are specified in 3GPP TS 33.180.

At operation 2, the partner MC service server performs an initial authorization check to verify that the MC service user is permitted to migrate to the partner MC system from the primary MC system of the MC service user. NOTE 2: The criteria for the initial authorization check is outside the scope of the present disclosure, but for example could be based on a pre-configured list of users who are expected to request migrated service authorization.

At operation 3, the partner MC service server identifies the primary MC system of the MC service user of the MC service client by use of the MC service ID of the MC service user in the primary MC system of the MC service user, which was presented by the MC service client in operation 1, and sends a migration service authorization request to the gateway server in the partner MC system.

At operation 4, the partner MC system gateway server identifies the primary MC system of the MC service user from the MC service ID presented in operation 3, and forwards the migration service authorization request to the gateway server of the primary MC system.

At operation 5, the gateway server in the primary MC system of the MC service user identifies the primary MC service server of the MC service user from the MC service ID presented in operation 3, and forwards the migration service authorization request to that MC service server.

At operation 6, the primary MC service server of the MC service user performs an authorization check, to verify that migration is permitted to that partner MC system by this MC service user using the indicated MC service user profile.

At operation 7, the primary MC service server marks the MC service user as having migrated, and records the partner MC system as the migrated MC system along with the security domain access information associated with the migrated MC service user's MC service ID.

At operation 8, the primary MC service server sends a migration service authorization response to the gateway server in the primary MC system.

At operation 9, the gateway server in the primary MC system sends the migration service authorization response to the gateway server in the partner MC system.

At operation 10, the gateway server in the partner MC system sends the migration service authorization response to the partner MC service server.

At operation 11, the partner MC service server sends the migration service authorization response to the MC service client, confirming that successful migration and service authorization has taken place. NOTE 3: If topology hiding is not used, the migration service authorization request and migration service authorization response messages are sent between the MC service servers in the primary and partner MC systems without the need to be sent via an MC gateway server.

Table 3 describes the information flow migration service authorization request sent from the MC service client of the migrating MC service user to the partner MC service server, and from the partner MC service server to the primary MC service server of the migrating MC service user.

TABLE 3

| Information element | Status | Description |
|---|---|---|
| MC service ID (see NOTE 1) | M | The MC service ID of the migrating MC service user provided by the partner MC system. |
| MC service ID | M | The MC service ID of the migrating MC service user in the primary MC system of the MC service user. |
| MC service user profile index (see NOTE 2) | M | The MC service user profile index of the selected MC service user profile. |
| Security domain access information | M | The security domain access information associated with the MC service ID of the migrating MC service user provided by the partner MC system (e.g., KMS URI). |

NOTE 1:
The MC service ID is provided by the identity management server in the partner MC system during authentication of the migrating MC service user.
NOTE 2:
The MC service user profile index refers to the MC service user profile provided by the primary MC system of the MC service user that has been selected by the MC service user in order to request migrated MC service on the partner MC system.

Figure 9:
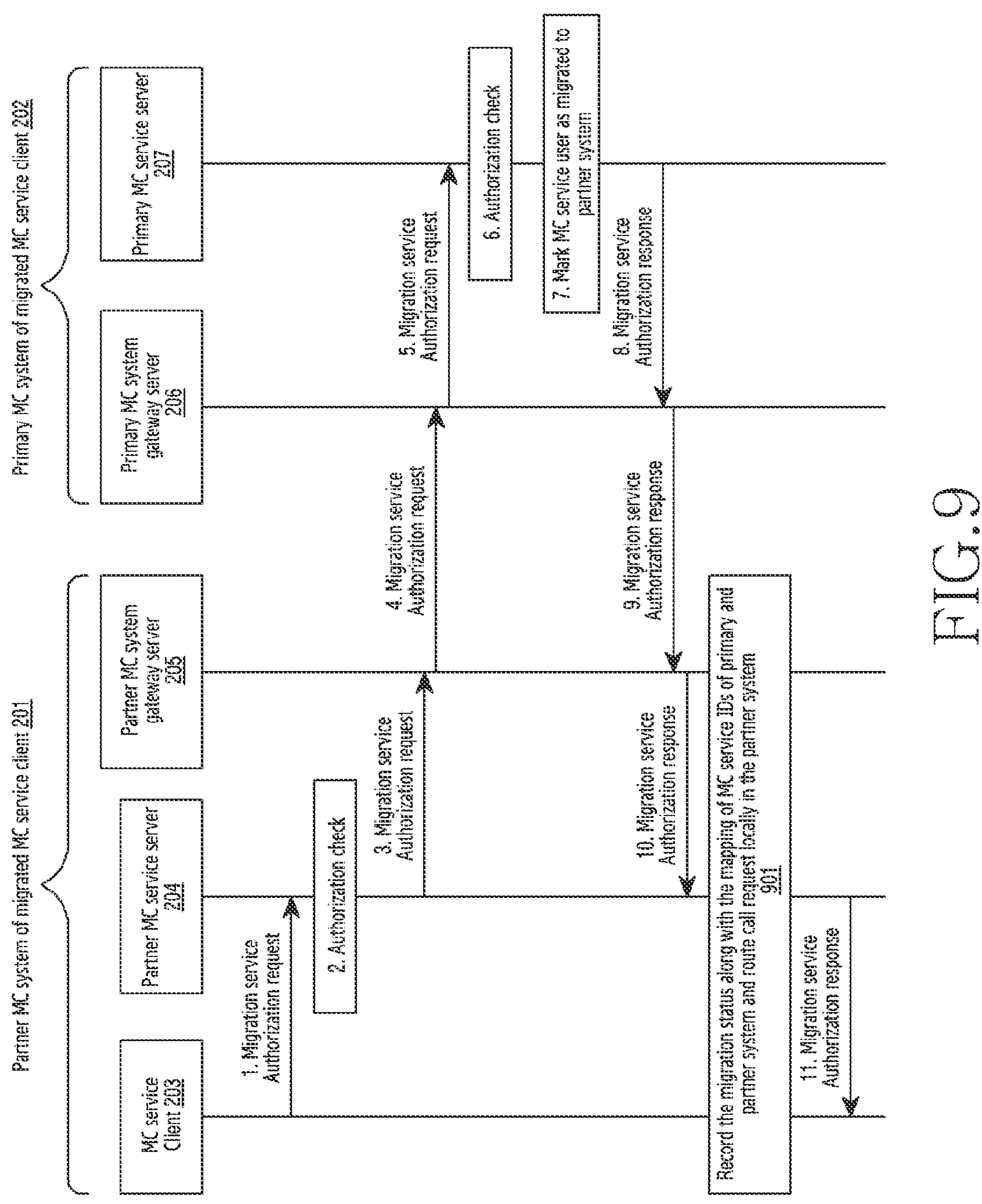
FIG. 9 is a sequence diagram illustrating service authorization when a partner MC service server stores a migration status, according to the embodiments.

FIG. 9 is a sequence diagram illustrating service authorization when the partner MC service server (204) stores the migration status, according to the embodiments.

The service authorization mechanism defined in the conventional method is enhanced to include the new information to store the migration status along with the mapping of the MC service IDs obtained from the primary MC system and partner MC system in the partner MC system and uses this stored information to route the communication request which is received from the MC service users belongs to the migrated partner MC system of the communication target MC service user. This results in routing of the request in the migrated MC system. The detailed operations are as below:

At operation 1, the MC service client (203) requests migration service authorization with the partner MC service server (204) indicating the selected MC service user profile to be used during migrated MC service. The MC service client (203) provides both the MC service ID during user authentication in the partner MC system, and the MC service ID of the MC service user in the primary MC system of the MC service user. In an embodiment, the migrating MC service client (203) also provides authentication credentials which are specified in conventional methods.

At operation 2, the partner MC service server (204) performs an initial authorization check to verify that the MC service user is permitted to migrate to the partner MC system from the primary MC system of the MC service user. In an embodiment, the criteria for the initial authorization check is outside the scope of the present disclosure, but for example could be based on a pre-configured list of users who are expected to request migrated service authorization.

At operation 3, the partner MC service server (204) identifies the primary MC system of the MC service user of the MC service client (203) by use of the MC service ID of the MC service user in the primary MC system of the MC service user, which is presented by the MC service client (203) in operation 1, and sends a migration service authorization request to a gateway server in the partner MC system.

At operation 4, the partner MC system gateway server (205) identifies the primary MC system of the MC service user from the MC service ID presented in operation 3, and forwards the migration service authorization request to the gateway server of the primary MC system.

At operation 5, the gateway server in the primary MC system of the MC service user identifies the primary MC service server (207) of the MC service user from the MC service ID presented in operation 3, and forwards the migration service authorization request to that MC service server.

At operation 6, the primary MC service server (207) of the MC service user performs an authorization check, to verify that migration is permitted to that the partner MC system by the MC service user using the indicated MC service user profile.

At operation 7, the primary MC service server (207) marks the MC service user as having migrated, and records the partner MC system as the migrated MC system.

At operation 8, the primary MC service server (207) sends a migration service authorization response to the gateway server in the primary MC system.

At operation 9, the gateway server in the primary MC system sends the migration service authorization response to the gateway server in the partner MC system.

At operation 10, the gateway server in the partner MC system sends the migration service authorization response to the partner MC service server (204).

At operation 11, the partner MC service server (204) sends the migration service authorization response to the MC service client (203), confirming that successful migration and service authorization has taken place. In an embodiment, the partner MC system needs to store the necessary information related to the migrated MC service users (e.g., MC service ID of migrated MC service users provided by primary MC systems mapping with the MC service ID of migrated MC service users provided by partner MC systems, migration status of the MC service user as migrated in) to allow proper communication redirection once migrated MC service users either migrate to another partner MC system or migrate back to their primary MC system. The communications received from the MC service users belonging to the partner MC system are routed in the partner MC system if the migration status of the MC service user is migrated in. Otherwise, they are routed to the primary MC system of the migrated MC service user.

When topology hiding is not used, the migration service authorization request and migration service authorization response messages are sent between the MC service servers in the primary and partner MC systems without the need to be sent via an MC gateway server.

In the proposed method for receiving of successful authorization response by the partner MC system, the MC service ID of the primary MC system is stored. The stored information is further enhanced to record the mapping of the MC service IDs obtained from the primary MC system and the partner MC system along with the migration status (e.g., migrated in) in the partner MC system. While the MC service user is in the partner MC system (i.e., migrated MC system), the MC service users of the partner MC system can communicate with the migrated MC service user using the MC service ID of the migrated MC service user that is obtained from the partner MC system. The communication request is routed within the partner MC system based on the stored migration status (i.e., migrated in) of the MC service user. Once the migrated MC service user migrates back to its primary MC system or another partner MC system, then the communication request should be routed through the primary MC system of the migrated MC service user based on the migration status (i.e., migrated out) of the MC service user. In order to update the stored migration status as "migrated out," the migrated MC service user migrates back to its primary MC system or another partner MC system. In the disclosure, the service de-authorization mechanism is defined through which the MC service user service de-authorizes migration from the partner MC system.

The disclosed method for performing call routing from the users of the migrated partner MC system is based on migration status of the target user. In the disclosed method, the partner MC system should record the migrated MC service user's migration status along with the MC service IDs assigned by the primary MC system and partner MC systems. The communication request should be routed within the migrated MC system or to the primary MC system of the migrated MC service user based on the migration status. The migration status as "migrated in" can be updated by using an existing service authorization mechanism for migration to the partner MC system and service de-authorization mechanism of migration from a partner MC system in order to update the migration status as "migrated out."

In the disclosed method, the service de-authorization mechanism which aids in the routing of the communication request when the target is the migrated MC service user: 1) the migrated partner MC service system maintaining the status of the migrated MC service user along with mapping of MC service IDs assigned by the primary MC system and partner MC system; and 2) A service de-authorization mechanism when the migrated MC service user is leaving the migrated MC service system.

In the disclosed method, the service de-authorization mechanism which aids in the routing of the communication request when the target is the migrated MC service user:

1. The migrated partner MC service system maintaining the status of the migrated MC service user along with mapping of MC service IDs assigned by the primary MC system and partner MC system.
2. The service de-authorization mechanism when the migrated MC service user is leaving the migrated MC service system.

Figure 10:
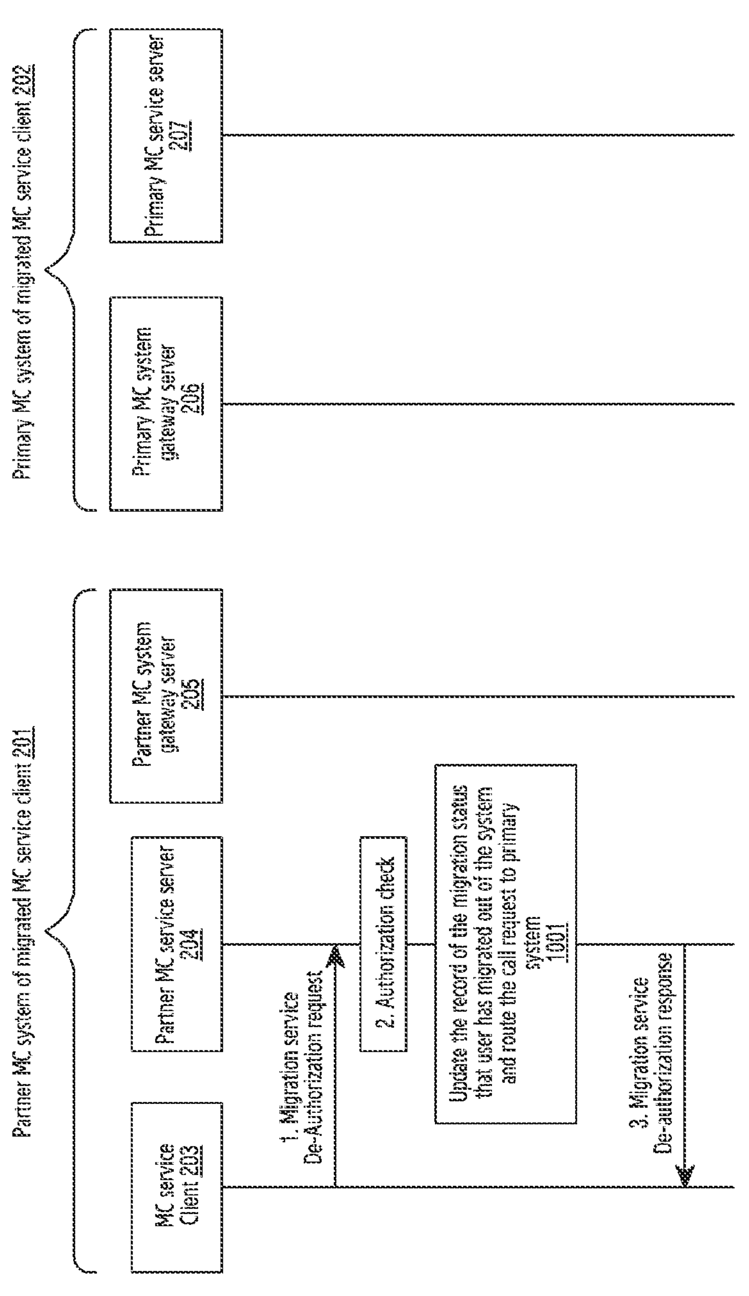
FIG. 10 is a sequence diagram illustrating service de-authorization for migration from partner MC system to the partner MC service server, according to the embodiments.

FIG. 10 is a sequence diagram illustrating service de-authorization for migration from the partner MC system to the partner MC service server (204) stores the migration status, according to the embodiments.

In an embodiment, the service de-authorization mechanism is defined for the conventional method to allow the service de-authorization of migration by the migrated MC service user from the partner MC system. On successful de-authorization of migration, the stored information about the migration status in the partner MC system is updated (e.g. migrated out) and this stored information is used to route the MC service communication request received from the MC service users when the target MC service user is migrated to the MC service system of the initiating MC service user or the target MC service user would have migrated back from the initiating MC service users MC service system to the target MC service user's primary MC service system or to another partner MC service system. The detailed operations are as below:

At operation 1, the MC service client (203) requests migration service de-authorization with the partner MC service server (204). The MC service client (203) provides both the MC service ID provided during user authentication in the partner MC system, and the MC service ID of the MC service user in the primary MC system of the MC service user. In an embodiment, the migrating MC service client (203) also provides authentication credentials which are specified in the conventional method.

At operation 2, the partner MC service server (204) performs an initial authorization check to verify that the MC service user is permitted to de-authorize of migration from partner MC system. At 1001, the partner MC service server (204) updates the record of the migration status that user has migrated out of the system and routes the call request to the primary system.

At operation 3, the partner MC service server (204) sends the migration service de-authorization response to the MC service client (203), confirming that successful migration service de-authorization has taken place.

In an embodiment, the partner MC system needs to update the stored necessary information related to the migrated MC service users (e.g., migration status of the MC service user as migrated out) to allow proper communication redirection once migrated MC service users either migrate to another partner MC system or migrate back to their primary MC system. The communications received from the MC service users belonging to the partner MC system are routed to the primary MC system if the migration status of the MC service user is migrated out.

The partner MC system can forward the service de-authorization request to the primary system if required and the primary MC system can use this information to remove the mapping which it maintains and can use it for any other purpose which is left to the implementation.

Figure 11:
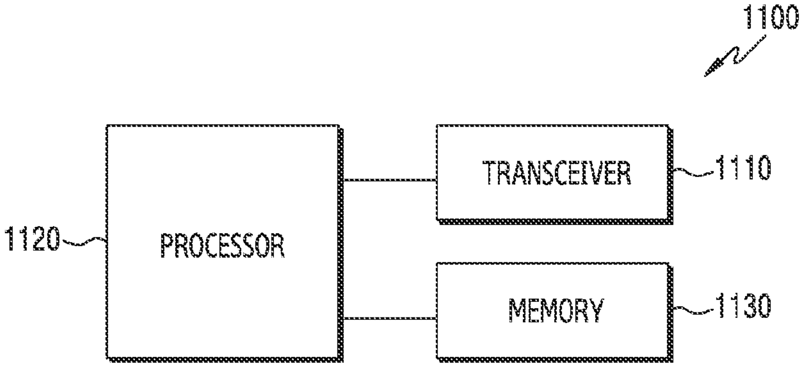
FIG. 11 illustrates a block diagram of an MC service server, according to the embodiments.

FIG. 11 illustrates a block diagram of an MC service server, according to the embodiments herein.

Here, a server is taken as an example to illustrate its structure and function. However, it should be understood that the structure and function shown can also be applied to a primary MC service server and a partner MC service server (or a primary MC system gateway server, a partner MC system gateway server, or the like).

Referring to FIG. 11, a server 1100 includes a transceiver 1110, a processor 1120, and a memory 1130. Under the control of the processor 1120, the server 1100 (including the transceiver 1110 and the memory 1130) is configured to perform the operations of the server described herein. Although shown as separate entities, the transceiver 1110, the processor 1120, and the memory 1130 may be implemented as a single entity, such as a single chip. The transceiver 1110, the processor 1120, and the memory 1130 may be electrically connected or coupled to each other. The transceiver 1110 may transmit a signal to and receive a signal from other entities, such as another server and/or an MC service client, or the like. The transceiver 1110 may be omitted. In this case, the processor 1120 may be configured to execute instructions (including computer programs) stored in the memory 1130 to control the overall operation of the server 1100, thereby implementing the operations of the server described herein. The server 1100 may correspond to an element described in FIG. 1 or FIG. 10.

Figure 12:
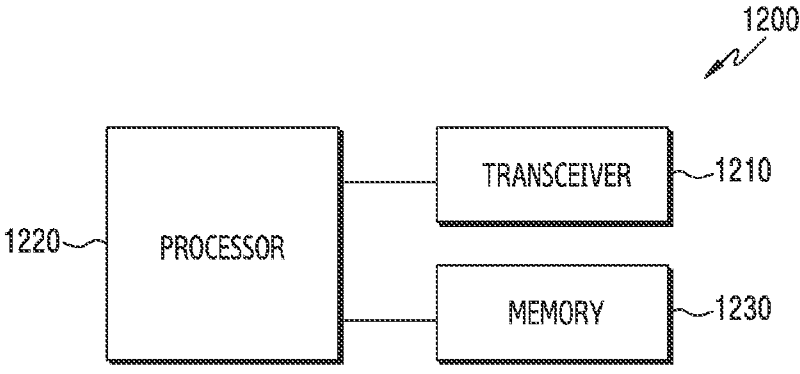
FIG. 12 illustrates a block diagram of a user equipment, according to the embodiments.

FIG. 12 illustrates a block diagram of a client, according to the embodiments herein.

In the disclosure, the terms "service client," "user equipment," "user terminal device," "user terminal," and "terminal device" may be used interchangeably.

Referring to FIG. 12, a client 1200 includes a transceiver 1210, a processor 1220, and a memory 1230. Under the control of the processor 1220 (which may be implemented as one or more processors), the client 1200 (including the transceiver 1210 and the memory 1230) is configured to perform the operations of the client described herein.

Although shown as separate entities, the transceiver 1210, processor 1220, and memory 1230 may be implemented as a single entity, such as a single chip. The transceiver 1210, the processor 1220, and the memory 1230 may be electrically connected or coupled to each other. The transceiver 1210 may transmit a signal to and receive a signal from other entities, such as another client, a server or the like. The transceiver 1210 may be omitted. In this case, the processor 1220 may be configured to execute instructions (including computer programs) stored in the memory 1230 to control the overall operation of the client 1200, thereby performing the operations of the client described herein. the client 1200 may correspond to a client described in previous figures.

The foregoing description of the specific embodiments will so fully reveal the general nature of the embodiments herein that others can, by applying current knowledge, readily modify and/or adapt for various applications such specific embodiments without departing from the generic concept, and therefore, such adaptations and modifications should be, and are intended to be, comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

While the disclosure has been shown and described with reference to various embodiments thereof, it will be understood by those skilled in the art that various changes in form and details may be made therein without departing from the spirit and scope of the of the disclosure as defined by the appended claims and their equivalents.

What is claimed is:

1. A method performed by a first server in a wireless communication system, the method comprising:

receiving, from a first client, a private call request for establishing a private communication with a second client;

determining whether the second client is migrated from the first server to a second server with a new service identifier (ID) assigned by the second server; and in case that the second client is migrated from the first server to the second server, transmitting, to the first client, a private call redirection message including information indicating that the second client is migrated to the second server and information on a new service identifier of the second client, wherein the private call redirection message includes security domain access information including a key management server (KMS) uniform resource identifier (URI) associated with the new service ID of the second client.

2. The method of claim 1, wherein the KMS URI allows the first client to download required security domain parameters and key materials to establish an end-to-end security connection during private communication.

3. The method of claim 1, wherein the first client and the second client are mission critical clients, and wherein the first server and the second server are mission critical servers.

4. The method performed by a first client in a wireless communication system, the method comprising:

transmitting, to a first server, a private call request for establishing the private communication with a second client;

receiving, from the first server, a private call redirection message, wherein the private call redirection message includes information that the second client is migrated to the second server and a new service identifier (ID) of the second client; and establishing the private communication with the second client based on the private call redirection message, wherein the private call redirection message includes security domain access information including a key management server (KMS) uniform resource identifier (URI) associated with the new service ID of the second client.

5. The method of claim 4, wherein the KMS URI allows the first client to download required security domain parameters and key materials to establish an end-to-end security connection during private communication.

6. The method of claim 4, wherein the first client and the second client are mission critical clients, and wherein the first server and the second server are mission critical servers.

7. A first server comprising:

at least one transceiver;

at least one hardware processor communicatively coupled to the at least one transceiver; and at least one memory, communicatively coupled to the at least one hardware processor, storing instructions executable by the at least one processor individually or in any combination to cause the first server to:

receive, from a first client, a private call request for establishing the private communication with a second client;

determine whether the second client is migrated from the first server to a second server with a new service identifier (ID) assigned by the second server; and in case that the second client is migrated from the first server to the second server, transmit, to the first client, a private call redirection message including information indicating that the second client is migrated to the second server and information on a new service ID of the second client, wherein the private call redirection message includes security domain access information including a key management server (KMS) uniform resource identifier (URI) associated with the new service ID of the second client.

8. The first server of claim 7, wherein the KMS URI allows the first client to download required security domain parameters and key materials to establish an end-to-end security connection during private communication.

9. The first server of claim 7, wherein the first client and the second client are mission critical clients, and wherein the first server and the second server are mission critical servers.

10. A first client comprising:

at least one transceiver;

at least one hardware processor communicatively coupled to the at least one transceiver; and at least one memory, communicatively coupled to the at least one hardware processor, storing instructions executable by the at least one processor individually or in any combination to cause the first client to:

transmit, to a first server, a private call request for establishing the private communication with a second client;

receive, from the first server, a private call redirection message, wherein the private call redirection message includes information that the second client is migrated to the second server and a new service identifier (ID) of the second client; and establish the private communication with the second client based on the private call redirection message, wherein the private call redirection message includes security domain access information including a key management server (KMS) uniform resource identifier (URI) associated with the new service ID of the second client.

11. The first client of claim 10, wherein the KMS URI allows the first client to download required security domain parameters and key materials to establish an end-to-end security connection during private communication.

12. The first client of claim 10, wherein the first client and the second client are mission critical clients, and wherein the first server and the second server are mission critical servers.

* * * * *